United States Patent [19]
Vandewal et al.

[11] Patent Number: 5,785,344
[45] Date of Patent: Jul. 28, 1998

[54] ACTIVE ROLL CONTROL

[75] Inventors: Bart Vandewal, Alken; Hans Moors, Tongeren, both of Belgium

[73] Assignee: Tenneco Automotive Inc., Lake Forest, Ill.

[21] Appl. No.: 589,325

[22] Filed: Jan. 22, 1996

[51] Int. Cl.$^6$ .................................................. B60G 11/26
[52] U.S. Cl. .................... 280/714; 280/112.1; 280/704; 280/709
[58] Field of Search .................... 280/112.1, 772, 280/714, 709, 710

[56] References Cited

U.S. PATENT DOCUMENTS

| | | |
|---|---|---|
| 2,279,120 | 4/1942 | Hurley .................................. 280/710 |
| 2,353,503 | 7/1944 | Rost et al. ........................... 280/112.1 |
| 4,170,279 | 10/1979 | Pelletier . |
| 4,295,660 | 10/1981 | Toti et al. . |
| 4,345,661 | 8/1982 | Nishikawa . |
| 4,371,182 | 2/1983 | Brown .................................. 280/714 |
| 4,411,447 | 10/1983 | Hart . |
| 4,655,440 | 4/1987 | Eckert . |
| 4,848,790 | 7/1989 | Fukunaga et al. .................. 280/714 |
| 4,966,390 | 10/1990 | Lund et al. . |
| 4,993,744 | 2/1991 | Hiromoto et al. . |
| 5,013,061 | 5/1991 | Fujimura et al. . |
| 5,015,009 | 5/1991 | Ohyama et al. . |
| 5,040,823 | 8/1991 | Lund . |
| 5,076,606 | 12/1991 | Takahashi . |
| 5,085,460 | 2/1992 | Takahashi . |
| 5,087,073 | 2/1992 | Lund . |
| 5,174,603 | 12/1992 | Lund . |
| 5,217,246 | 6/1993 | Williams et al. . |

Primary Examiner—Eric D. Culbreth
Attorney, Agent, or Firm—Harness, Dickey & Pierce, P.L.C.

[57] ABSTRACT

An active roll control and leveling system operating between the sprung and unsprung masses of a vehicle or the like includes a plurality of shock absorbers attached between the sprung mass and the unsprung mass, a hydraulic source for supplying fluid at two hydraulic pressures, a sensor for detecting the vehicle's inertial change induced when the vehicle is turning, and a control unit for actively introducing fluid at hydraulic pressure to each shock absorber. The active roll control and leveling system includes a pump with a reservoir and a high pressure accumulator for delivering two separate hydraulic pressures. The active roll control and leveling system also includes an accumulator for each shock absorber and a controlling plunger for directing the pressures simultaneously to the shock absorbers.

23 Claims, 3 Drawing Sheets

ACTIVE ROLL CONTROL

BACKGROUND AND SUMMARY OF THE INVENTION

This invention relates generally to a suspension system for vehicles or the like, and more specifically to an active anti-roll suspension system that actively controls the roll of a vehicle when the vehicle is maneuvering around a corner.

An active anti-roll suspension system is a motor vehicle suspension system where the conventional suspension components, such as springs and dampers, are assisted by auxiliary devices to correct, change or control the attitude of the vehicle. The main goal of such a system is to reduce the tilting or rolling of the vehicle body when the vehicle is turning, thereby improving vehicle safety and enhancing driver and passenger comfort.

Various vehicle anti-roll systems have been proposed for preventing a vehicle from rolling while it is being turned. One method of reducing roll is to measure the force at each shock absorber or connection point and vary the pressure in the shock absorber accordingly. Another method utilizes a combination of hydraulic and pneumatic pressures to counter the roll forces. Yet another method of reducing roll is to establish a total vehicle concept, linking all four corners of the vehicle to one adjusting system.

For example, U.S. Pat. No. 5,217,246 to Williams et al discloses an active suspension system which includes sensors for measuring loads transmitted to the sprung mass and means for producing signals proportional to the values of the measured loads to adjust a hydraulic actuator. While this system actively adjusts the suspension system based on measured loads experienced at each connection point between a wheel and the vehicle, the system can be costly and quite complex.

Another example is U.S. Pat. No. 4,993,744 to Hiromoto et a). U.S. Pat. No. 4,993,744 discloses an anti-roll system for stabilizing the orientation of a vehicle body using a combination of hydraulic and pneumatic forces to modify the vertical forces exerted on the vehicle body. Each cylinder contains an oil and a gas chamber such that, in combination with an accumulator, work to vary the pressures in each chamber to achieve a balanced condition. The system disclosed herein operates to vary the pressures of the oil and gas within each cylinder independently of other cylinders and relies on a microprocessor to achieve overall vehicle stability. This system can also be quite complex and costly.

U.S. Pat. No. 4,411,447 to Hart discloses a vehicle suspension system that utilizes a plurality of accumulators, the main accumulator acts as an absorbing means for the fluid in the system during normal driving conditions and small bounces. When a larger force (or bounce) is encountered, the pressure in the main accumulator exceeds a predetermined limit and the auxiliary accumulators are used to assist the main accumulator. As a result, the system provides a greater stiffness when larger forces are encountered U.S. Pat. Nos. 4,966,390, 5,040,823, 5,087,073, and 5,174,603 to Lund all are directed to anti-roll systems that interconnect all four wheels into a single, closed hydraulic circuit which operates in response to a single hydraulic signal indicative of vehicle roll forces.

Although the above-discussed anti-roll and suspension systems have generally provided significant advantages over their predecessors, they have generally proved to be relatively expensive, complex, or inconvenient to manufacture, install or service.

Furthermore, many of the prior anti-roll and suspension systems are designed to monitor and actively change only one wheel mechanically, and use a microprocessor to coordinate the other corresponding devices on the other wheels in order to achieve the desired anti-roll effect. While this approach may prove effective, the system relies on coordination between several systems and proper communication between them.

Also, the systems previously discussed are not easily upgradeable nor do they allow for component modification without having to change the entire suspension system.

Therefore, it is a general object of the present invention to provide a new and improved active anti-roll suspension system in the form of a shock absorber assembly that actively adjusts the damping forces on two adjacent wheels on the same axle, thereby efficiently counteracting the torque induced during a turn.

A more specific object of the present invention is to provide a simple and cost-effective active anti-roll suspension system that actively controls the roll angle of the car body in a cornering condition without decreasing passenger comfort during normal highway conditions.

Still another object of the present invention is to provide an anti-roll device that is easily upgradeable and serviceable.

In accordance with this invention, an active anti-roll suspension system for a motor vehicle axle includes two shock absorbers, largely vertical coupling links adapted to be connected between the ends of an axle, and the vehicle body. A hydraulic pump is provided with a corresponding hydraulic reservoir for supplying a predetermined hydraulic pressure to the shock absorbers. A high pressure accumulator is attached to the pump by a parallel hydraulic line to the reservoir for providing a second higher hydraulic pressure, both hydraulic pressures being connected via hydraulic means to a control valve. The control valve is hydraulically connected to a pressure distribution unit and selectively sends fluid under high or normal pressure to the pressure distribution unit. The pressure distribution unit has two separate compartments, each compartment has a slidable disc forming an outer and inner chamber. The discs are rigidly attached to each other by a connecting rod forming a plunger.

The foregoing and other objects, and advantages, will become more apparent when viewed in light of the accompanying drawings, and following detailed description therein.

BRIEF DESCRIPTION OF THE DRAWINGS

FIG. 4 is a partial diagrammatical view of a preferred embodiment of the present invention illustrating the sensing and control portions shown in FIG. 1 during a right turn.

DESCRIPTION OF THE PREFERRED EMBODIMENT

FIGS. 1 through 5 illustrate the preferred embodiment of an active anti-roll suspension system, for use as a shock absorber assembly in an automobile vehicle. Although the present invention is shown in the preferred embodiment as including a relatively conventional hydraulic shock absorber, one skilled in the art will readily recognize from the following discussion that the principles of the present invention are equally applicable to strut type shock absorbers or subassemblies, either with or without suspension coil springs surrounding the shock absorber assembly, as well as to shock absorber assemblies of other types adapted for other applications. It should be understood from the outset that while the following discussion illustrates a particular embodiment of the present invention, this embodiment merely represents a best mode of currently practicing the invention, and other modifications may be made to the particular embodiment without departing from the spirit and scope of the invention.

Figure 1:
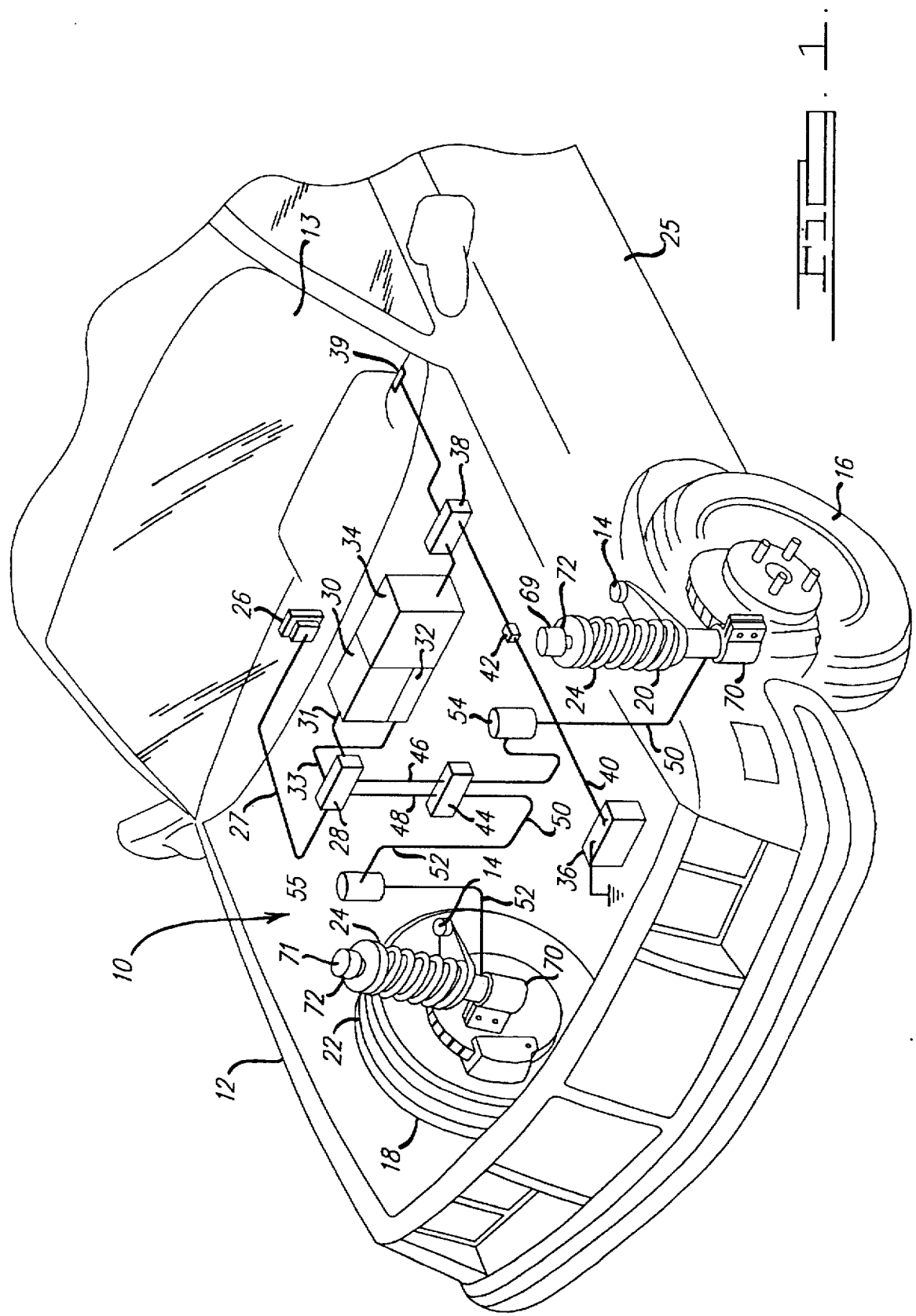

Referring to FIG. 1, an active anti-roll suspension system 10 is depicted in operative association with a diagrammatic representation of the front portion of a conventional automobile 12. The automobile 12 has a front suspension system 14 including a transversely extending front axle assembly (not shown) to support the front wheels 16,18. The front axle assembly is connected to the automobile 12 by means of a pair of shock absorbers 20,22 and by helical coil springs 24. In the preferred embodiment, shock absorbers 20,22 are a mono-tube design, however, a dual tube design could be used and not depart from the scope of the invention. In either case, shock absorbers 20,22 serve to dampen the relative movement of the unsprung portion (i.e., the front suspension) and the sprung portion (i.e., the body 25) of automobile 12.

Anti-roll suspension system 10 includes sensing means 26 electrically connected by an electrical conduit 27 to a control valve 28. Control valve 28 is hydraulically connected to a reservoir 30 by a hydraulic line 31. A high pressure accumulator 32 is connected to control valve 28 by a hydraulic line 33. High pressure accumulator 32 and reservoir 30 are supplied with hydraulic fluid by a hydraulic pump 34.

Hydraulic pump 34 is controlled by an electrical control module 38 and is energized from a conventional vehicle battery 36 by way of an electrical conductor 40 having a suitable safety fuse 42 preferably in the electrical circuit between battery 36 and the remainder of the electrical components. Control module 38 is electrically connected to pump 34 and operated by a mechanical switch 39 located in the automobile passenger compartment 13.

Control valve 28 is connected to a pressure distribution unit 44 by left and right supply lines 46 and 48. The pressure distribution unit 44 is connected to the left and right shock absorbers 20,22 by supply lines 50 and 52. In line, between the pressure distribution unit 44 and shock absorbers 20,22 is an accumulator 54,55, respectively.

Referring now to FIG. 2 through 5, a more detailed description of the preferred embodiment is illustrated. Shock absorbers 20,22 each comprise an elongated pressure cylinder 56,57 defining a damping fluid-containing working chamber 58,60. The pressure cylinders each have 56,57 have a straight cylindrical portion 62,63 and a reciprocal piston 64,66 slidably disposed therein, respectively. The reciprocal pistons 64,66 are each secured to an axially extending piston rod 69,71. The piston rods 69,71 are attached to the spring portion of the automobile 12 by mounting bolts (not shown). At the other end of the shock absorbers 20,22, opposite the axially extending pistons, supply lines 50,52 are each connected to an oil orifice 68,73 to allow hydraulic fluid to enter into working chamber 58,60, respectively. A number of shock absorbers 20,22 can be included in the vehicle for any or all of the vehicle's wheel assemblies and are adapted to be selectively pressurized from a source of fluid pressure, such as electrically energized pump 34.

Shock absorbers 20,22 receive hydraulic fluid through oil orifices 68,73 connected to supply lines 50,52. Supply lines 50,52 each have an accumulator 54,55 in line to absorb substantial changes in pressure. The functional workings of an accumulator are well-known to those skilled in the art and will not be discussed further herein.

Supply lines 50,52 are each connected to an outlet orifice 74,76 of pressure distribution unit 44. Pressure distribution unit 44 further includes a first and second compartment 78 and 80, separated by a wall 82. Each compartment 78,80 is open to outlet orifice 74,76 which supplies shock absorbers 20,22 with hydraulic fluid as is dictated by pressure distribution unit 44. Further, each compartment 78,80 has an inlet orifice 84,86 that is hydraulically connected to control valve 28 by supply lines 46,48.

Pressure distribution unit 44 further comprises a plunger 88 consisting of a pair of pistons 90,92 and a rod 94 connecting pistons 90,92. Pistons 90,92 are slidably housed within compartments 78,80 defining a pair of outer chambers 96,98 and a pair of inner chambers 100,102.

Control valve 28 controls the output of hydraulic fluid conveyed through supply lines 46 and 48 to pressure distribution unit 44. Control valve 28 is preferably a bidirectional proportional valve as found in a standard power steering valve. Control valve 28 can be shifted to supply a low pressure from reservoir 30 to both supply lines 46,48. Similarly, control valve 28 can be shifted to supply high pressure from high pressure accumulator 32 to either of supply lines 46,48 while supplying a low pressure to the other of supply lines 46,48.

Sensing means 26 further includes a control mass 108 that is movable within sensing means 26. In the preferred embodiment, control mass 108 includes a steel ball moveable between a right turn stop switch 110 and a left turn stop switch 112. However, a number of inertia detecting means can be incorporated without departing from the scope of the invention. Control mass 108 is normally biased to the center of sensing means 26 by a sloped bottom surface 114.

In operation, as shown in FIG. 1, in order to dampen the relative movement between the sprung portion (i.e., the body 25) and the unsprung portion (i.e., the front suspension system 14) of automobile 12, a lower end 70 of each shock absorber 20,22 is adapted to be secured to the unsprung front suspension system 14, or some other unsprung portion of the vehicle. Similarly, the upper or longitudinally outer end of piston rods 69,71 are each adapted to be connected to the sprung portion of the vehicle by way of an upper end fitting assembly 72. It should be noted that shock absorbers 20,22 can be the only suspension springs for the vehicle or they can be used in conjunction with other suspension spring components. The use of external spring 24 can assist to absorb the shock forces exerted onto shock absorbers 20,22. The more stiff external springs 24, the more assistance external springs 24 will provide when large loads are being supported by shock absorbers 20,22. However, large external springs 24 can also be disadvantageous when smaller loads are being supported by shock absorbers 20,22 as the external springs will cause more of the shock forces to be transmitted to body 25 and create discomfort to the occupants of automobile 12. Again, the functional workings of a shock absorber, similarly to an accumulator, are well-known to those skilled in the art and will not be discussed further herein.

Referring again to FIG. 2 through 5, pump 34 has a fluid feed line 104 connected to fluid reservoir 30. Fluid reservoir 30 holds fluid, such as hydraulic oil, at a pressure supplied by pump 34. A second feed line 106 connects pump 34 to high pressure accumulator 32. High pressure accumulator 32 amplifies the fluid supplied by pump 34 to a pressure higher than is being held in fluid reservoir 30.

Figure 2:
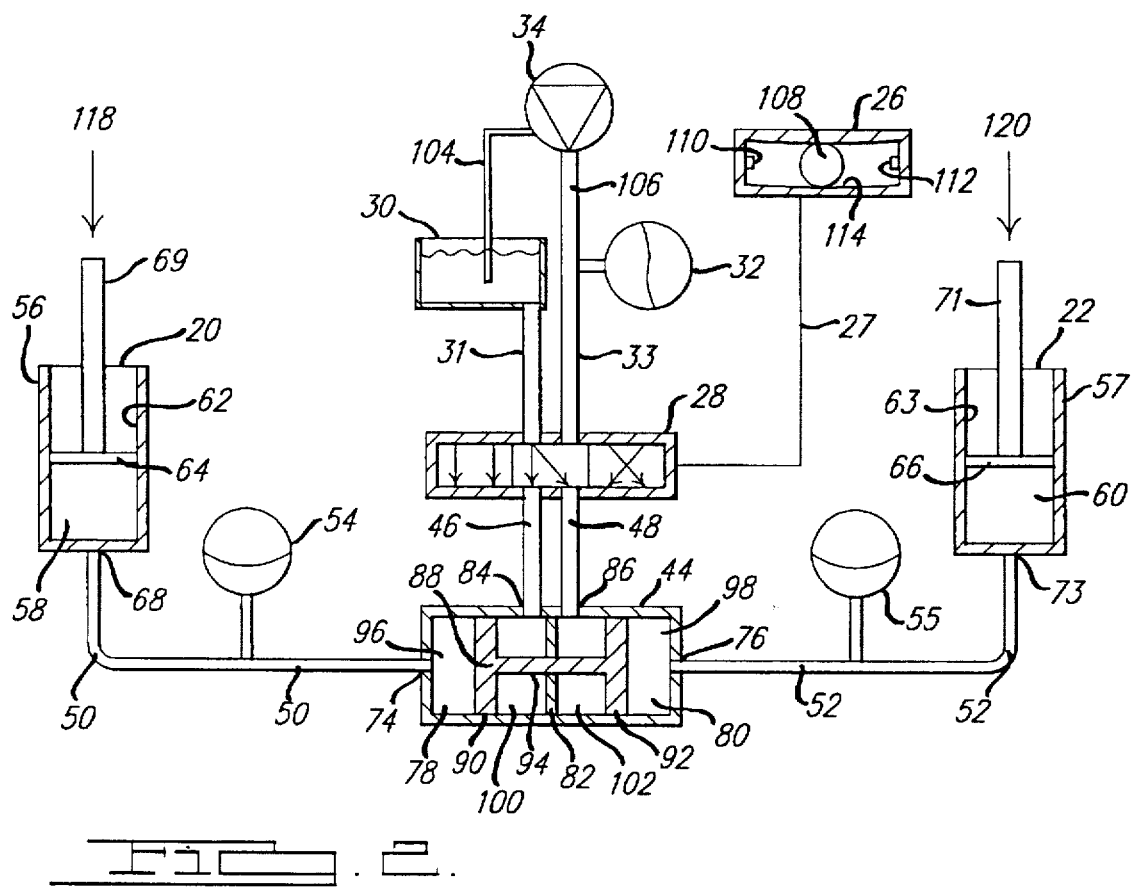
FIG. 2 is a diagrammatical view of a preferred embodiment of the present invention illustrating the anti-roll control system of FIG. 1 in the neutral or static state.

The active anti-roll suspension system 10 can be activated or deactivated by switch 39 in the passenger compartment 13 of automobile 12 (FIG. 1). When deactivated, control valve 28 is in the center position as shown in FIG. 2.

Under this condition, supply lines 46 and 48 are both connected to reservoir 30 and low or "normal" pressure is delivered to both inner chambers 100,102. Further, control valve 28 is ported to pass hydraulic fluid between both inner chambers 100,102. Since both inner chambers 100,102 are equally pressurized, pistons 90,92 are equally displaced within the respective compartments 78,80. When both pistons are equally displaced and connected, shock absorbers 20,22 respond co-actively as closed loop systems.

In a closed loop system, the working chambers 58,60 work dependently on each other when pressure forces 118, 120 are exerted on working chamber 58,60 through piston rods 69,71. Pressure forces 118,120 are transferred through supply lines 50,52, into accumulators 54,55 and then into the outer chambers 96,98 of compartments 78,80. When the pressure in one of the outer chambers 96,98 pushes against one of the pistons 90,92, inner chambers 100,102 effectively push fluid toward the opposite supply lines 46,48 and the other of pistons 90,92 slides to accommodate the force.

The pressure forces 118,120 exerted on the left and right shock absorbers 20,22 are translated through pressure distribution unit 44 to the opposite shock absorber 20,22. The aforementioned closed system is superior when compared to a standard pair of shock absorbers working independently on a front suspension system 14 since the forces experienced on one shock absorber 20,22 is actively distributed between both shock absorbers 20,22.

Conversely, when active anti-roll suspension system 10 is activated, control valve 28 determines the pressure delivered to shock absorbers 20,22. Sensing means 26 sends a signal to control valve 28 depending on the forces exerted on automobile 12 due to inertia.

When automobile 12 is introduced to a turn, automobile 12 experiences inertia forces. The same inertia forces act on control mass 108 in sensing means 26. When the inertia forces are strong enough to overcome the biasing of sloped bottom surface 114, control mass 108 shifts to contact stop switch 110,112.

Figure 3:
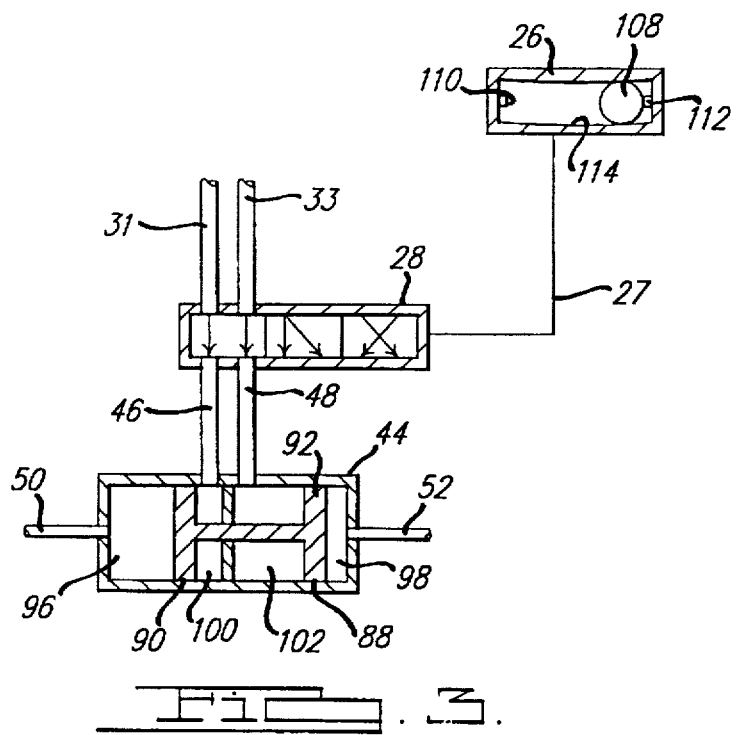
FIG. 3 is a partial diagrammatical view of a preferred embodiment of the present invention illustrating the sensing and control portions shown in FIG. 1 during a left turn.
Figure 5:
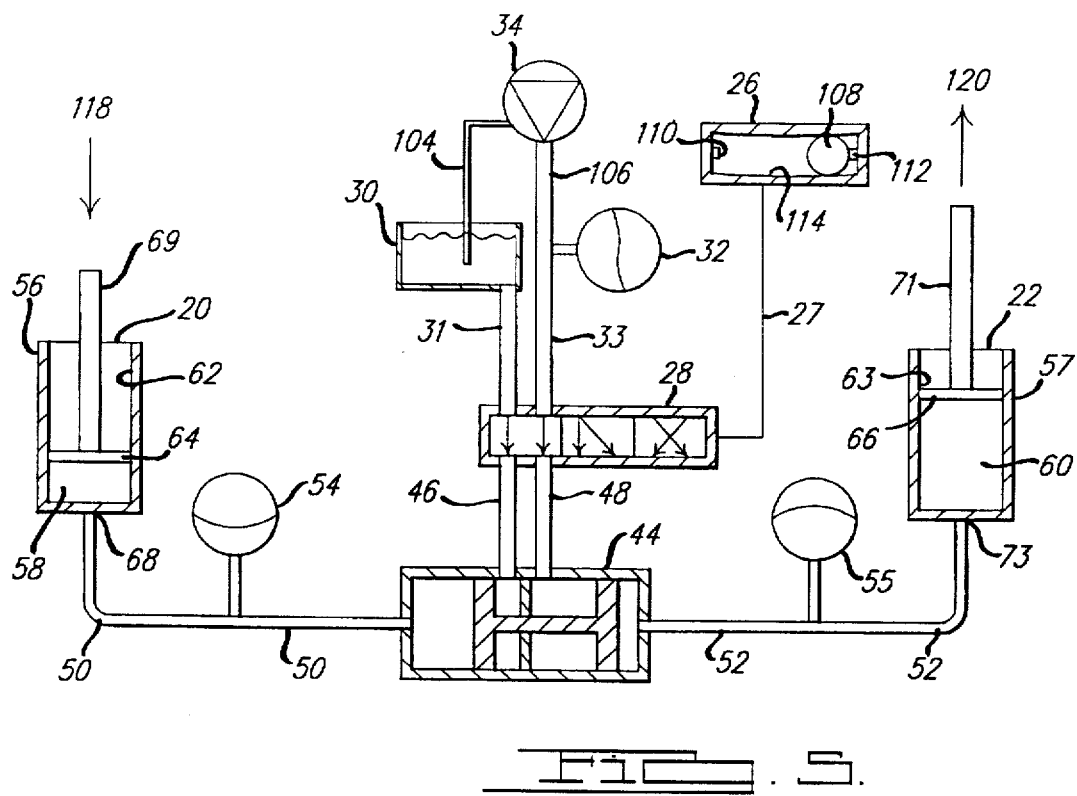
FIG. 5 is a diagrammatical view illustrating a preferred embodiment of the present invention in a left turn.

For example, in FIG. 3 and 5, a left turn is illustrated. When the inertia forces overcome the bias of sloped bottom surface 114 of sensing means 26, control mass 108 moves to the right and contacts right stop switch 112. Sensing means 26 sends a signal to control valve 28 that shifts the valve, sending low pressure from reservoir 30 through supply line 46 and simultaneously sending higher pressure from high pressure accumulator 32 through supply line 48. The higher pressure in inner chamber 102 pushes piston 92 to the right forcing hydraulic fluid out of outer chamber 98. The hydraulic fluid forced out of outer chamber 98 is pushed through supply line 52 into accumulator 55 and into working chamber 60. The increased hydraulic fluid in working chamber 60 pushes against piston 66 forcing it upwardly. As piston 66 is forced upwardly, axially extending piston rod 71 which is connected to piston 66 also is forced upwardly, effectively counteracting external forces 120 (FIG. 2) exerted on shock absorber 22 as a result of the inertia induced while making the turn.

At the same time, piston 90 is being pulled to the right by piston 92 and interconnecting rod 94. Since the pressure in inner chamber 100 is less than the pressure in inner chamber 102, plunger 88 is moved to the right and the volume of outer chamber 96 is increased. The increased volume in outer chamber 96 allows hydraulic fluid in working chamber 58 to move out into the now larger outer chamber 96. This reduced volume and corresponding pressure in working chamber 58 reduces the effective pressure working against external forces 118 (FIG. 2) acting on shock absorber 20, allowing piston 64 to move with less resistance downward.

Figure 4:
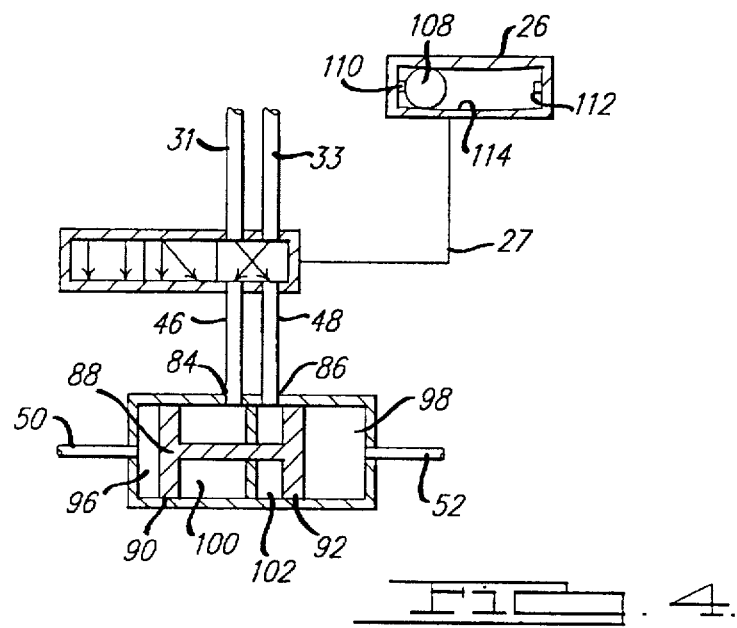
FIG. 4 is a perspective view of a preferred embodiment of the present invention illustrating the anti-roll control system connected to the front axle of an automobile vehicle.

Similarly, as shown in FIG. 4, when a right turn is introduced to automobile 12, control mass 108 is forced to the left by inertia forces. The inertia forces overcome the bias of sloped bottom surface 114 of sensing means 26, control mass 108 moves to the left and contacts left stop switch 110. Sensing means 26 sends a signal to control valve 28 that shifts the valve, sending low pressure from reservoir 30 through supply line 48 and simultaneously sending higher pressure from high pressure accumulator 32 through supply line 46. The higher pressure in inner chamber 100 pushes piston 90 to the left forcing hydraulic fluid out of outer chamber 96. The hydraulic fluid forced out of outer chamber 96 is pushed through supply line 50 into accumulator 54 and into working chamber 58. The increased hydraulic fluid in working chamber 58 pushes against piston 64 forcing it upwardly. As piston 64 is forced upwardly, axially extending piston rod 69 which is connected to piston 64 also is forced upwardly effectively, counteracting external forces 118 (FIG. 2) exerted on the shock absorber 20 as a result of the inertia induced while making the turn.

At the same time, piston 92 is being pulled to the left by piston 90 and interconnecting rod 94. Since the pressure in inner chamber 102 is less than the pressure in inner chamber 100, plunger 88 is moved to the left and outer chamber 98 is increased. The net result is that the right shock absorber 20 has an increased pressure force acting against outside pressure, while the left shock absorber 22 has a decreased pressure force acting against outside pressure.

This system has the advantage that with a relatively lightweight pump, having approximately 2 kWatt of power, a vehicle can be actively roll controlled. Because the left and right shock absorbers 20,22 are connected, only one control valve 28 is required. Similarly, the use of a power steering valve for the control valve 28 and incorporating a standard hydraulic pump and accumulator technology will keep prices reasonably low.

Various other advantages and modifications will become apparent to one skilled in the art after having the benefit of studying the teachings of the specification, the drawings, and the following claims.

What is claimed is:

1. An active anti-roll control system for a vehicle having a sprung portion and an unsprung portion, said system comprising:

a plurality of damping means, each of said damping means having first and second ends, the first end of each of said plurality of damping means connected to said sprung portion and the second end connected to said unsprung portion;

pressure delivery means for supplying fluid at a first hydraulic pressure and fluid at a second hydraulic pressure to said plurality of damping means;

control means disposed between said plurality of damping means and said pressure delivery means for controlling the output of said fluid at one or more hydraulic pressures from said pressure delivery means;

sensing means connected to said control means for sensing a roll condition induced on said vehicle and producing a signal representative thereof; and pressure distribution means disposed between said control means and said damping means for actively introducing said fluid at said first pressure to one of said damping means and actively introducing said fluid at said second pressure to another of said damping means based on said signal.

2. The active anti-roll control system according to claim 1, wherein each of said plurality of damping means further includes a cylinder having a piston slidably disposed therein, said piston cooperating with said cylinder to form a variable pressure chamber that is filled with said fluid at said first or said second hydraulic pressure.

3. The active anti-roll control system according to claim 1, wherein said means for supplying said fluid at first and said second hydraulic pressure includes a pump and a reservoir hydraulically connected thereto.

4. The active anti-roll control system according to claim 1, wherein said first and said second hydraulic pressures are unequal.

5. The active anti-roll control system according to claim 1, wherein the means for supplying said fluid at said first and second hydraulic pressure further includes a pump and a high pressure accumulator disposed between said control means and said pump.

6. The active anti-roll control system according to claim 1, wherein said pressure distribution means includes a pressure distribution unit having a first compartment and a second compartment, said first and second compartments each having a piston slidably disposed therein.

7. The active anti-roll control system according to claim 6, wherein said piston of said first compartment is connected to said piston of said second compartment to form a plunger.

8. The active anti-roll control system according to claim 7, wherein said first and second compartments further include an outer chamber and an inner chamber, wherein said plunger is movable between a first position wherein said outer chamber of said first compartment is pressurized and a second position wherein said outer chamber of said second compartment is pressurized.

9. The active anti-roll control system according to claim 8, wherein said plunger is biased towards a center position between said first position and said second position.

10. The active anti-roll control system according to claim 1, wherein at least one of said damping means further includes an accumulator.

11. The active anti-roll control system according to claim 1, wherein the control means is bidirectional.

12. The active anti-roll control system according to claim 1, wherein the sensing means further includes biasing means and a control mass, said control mass being biased by said biasing means and said control mass being movable in accordance with a chance in an inertia of the vehicle.

13. An active anti-roll control system for a vehicle having a sprung portion and an unsprung portion, said system comprising:
a plurality of shock absorbers, each of said shock absorbers having a cylinder and a piston, said cylinder of each of said shock absorbers connected to one of said sprung and unsprung portions and said piston of each of said shock absorbers connected to the other of said sprung and unsprung portions;
means for conveying fluid at a first and a second hydraulic pressure connected to said plurality of shock absorbers;
control means disposed between said shock absorbers and said conveying means for controlling the output of said fluid at one or more hydraulic pressures from said conveying means, said control means having a first and a second compartment, said first and second compartments each having a piston slidably housed therein forming an outer chamber and an inner chamber, said pistons being connected to form a plunger which is movable between a first position wherein said outer chamber of said first compartment is pressurized and a second position wherein said outer chamber of said second compartment is pressurized; and
sensing means connected to said control means for sensing a change in inertia of the vehicle and moving said control means between said first and second position based on said change in said inertial of the vehicle.

14. The active anti-roll control system according to claim 13, wherein said means for supplying said fluid at said first and said second hydraulic pressure includes a pump and a reservoir hydraulically connected thereto.

15. The active anti-roll control system according to claim 13, wherein said first and said second hydraulic pressures are unequal.

16. The active anti-roll control system according to claim 13, wherein at least one of said shock absorbers further includes an accumulator.

17. The active anti-roll control system according to claim 13 wherein the means for conveying said fluid at said first and second hydraulic pressure further includes a pump and a high pressure accumulator disposed between said control means and said pump.

18. The active anti-roll control system according to claim 13 wherein the control means is bidirectional.

19. The active anti-roll control system according to claim 13 wherein the sensing means comprises a control mass that is centrally biased and is movable in accordance with said change in said inertia of the vehicle.

20. An active anti-roll control system for a vehicle having a sprung portion and an unsprung portion, said system comprising:
a plurality of shock absorbers with a first end of each of said shock absorbers connected to said sprung portion and a second end of each of said shock absorbers connected to said unsprung portion;
a fluid supply source connected to said plurality of shock absorbers having a pump, a reservoir, and a high pressure accumulator for supplying fluid at a first hydraulic pressure and a second hydraulic pressure;
a control valve connected to said fluid supply source, said control valve capable of controlling the output of said fluid at one or more hydraulic pressures from said fluid supply source;
sensing means connected to said control valve for detecting a roll condition induced on the vehicle, said sensing means having means for producing a signal representative thereof; and
a pressure distribution unit disposed between said control valve and said shock absorbers, said pressure distribution unit having a first and a second compartment, each of said compartments having a piston slidably housed therein, and a rod connecting said two pistons, said pressure distribution unit actively introducing said fluid at said first pressure to one of said shock absorbers and actively introducing said fluid at said second pressure to another of said shock absorbers based on said signal.

21. The active anti-roll control system according to claim 20, wherein said first and said second hydraulic pressures are unequal.

22. The active anti-roll control system according to claim 20, wherein the control valve is bidirectional.

23. The active anti-roll control system according to claim 20, wherein the sensing means further includes biasing means and a control mass, said control mass being biased by said biasing means and said control mass being movable in accordance with said change in said inertia of the vehicle.

* * * * *